US005720988A

United States Patent [19]

Yoneda

[11] Patent Number: 5,720,988

[45] Date of Patent: Feb. 24, 1998

[54] SLIDE BOTTOM DEAD CENTER POSITION COMPENSATING DEVICE

[75] Inventor: Hisato Yoneda, Ebina, Japan

[73] Assignee: Aida Engineering Ltd., Kanagawa, Japan

[21] Appl. No.: 714,469

[22] Filed: Sep. 16, 1996

[30] Foreign Application Priority Data

Apr. 11, 1996 [JP] Japan .................................... 8-114298

[51] Int. Cl.[6] ........................... B29C 43/58; B30B 15/14

[52] U.S. Cl. ........................... 425/150; 100/43; 100/257; 264/40.5; 425/171

[58] Field of Search .................................... 425/150, 169, 425/171; 264/40.5; 100/43, 257

[56] References Cited

U.S. PATENT DOCUMENTS 4,917,588 4/1990 Grabener et al. ........................ 425/150
5,069,613 12/1991 Inaba et al. ............................ 425/150
5,547,360 8/1996 Yokoyama ............................. 425/150

*Primary Examiner*—James P. Mackey

*Attorney, Agent, or Firm*—Wood, Phillips, VanSanten, Clark & Mortimer

[57] ABSTRACT

A slide bottom dead center position compensating device comprises an angle sensor for detecting a crank angle, a contact sensor for detecting contact between stoppers on molds or, instead of the contact sensor, a position sensor for detecting that a slide has reached a preset control position near the bottom dead center of the slide, a controller, a setting unit for setting a control condition for the slide bottom dead center position, and a bottom dead center compensating unit. The controller determines a crankshaft rotational angle during the contact between the stoppers or a crankshaft rotational angle under a condition of the slide descending from the control position, calculates a slide compensation amount necessary for making the determined crankshaft rotational angle equal to a control rotational angle preset by the setting unit, and compensates the bottom dead center position of the slide through a bottom dead center compensating unit in accordance with the calculated slide compensation amount. Regardless of whether or not the molds are provided with stoppers, the bottom dead center position of the slide is compensated to be constant in a mechanical press in which the molds are employed for pressing.

2 Claims, 3 Drawing Sheets

SLIDE BOTTOM DEAD CENTER POSITION COMPENSATING DEVICE

BACKGROUND OF THE INVENTION

Constituent members of a mechanical press are subjected to temperature change upon the start of operation and finally brought into a certain temperature. Due to such a temperature change, the bottom dead center position of a slide is also changed. The present invention relates to a technique for compensating the slide bottom dead center position so that it is held at a fixed position.

As the prior art for compensating the bottom dead center position of a slide in a mechanical press, there is known a device for detecting the actual bottom dead center position of the slide and compensating the bottom dead center position in accordance with a deviation between the preset bottom dead center position, or the bottom dead center position at the start of operation, and the detected bottom dead center position. However, a device for compensating the bottom dead center position of a slide in a mechanical press which performs pressing by using molds provided with stoppers has not been proposed.

For a mechanical press wherein molds are provided with stoppers and parts are pressed by contacting the stoppers against each other for each cycle, the bottom dead center of the slide is put under restraint of the mold stoppers and not appreciably changed.

In that case, when the mechanical press continues operation, constituent members of the mechanical press are subjected to temperature change and this temperature change brings change in contact pressure of the stoppers. As a result, the load acting on the mechanical press is changed and the accuracy of pressed parts is adversely affected. However, the prior art has not been adaptable for such a problem.

SUMMARY OF THE INVENTION

An object of the present invention is to provide a slide bottom dead center position compensating device in a mechanical press which can compensate the bottom dead center position regardless of whether pressing is performed by providing stoppers on molds and contacting the stoppers against each other or pressing is performed by using molds provided with no stoppers.

To achieve the above object, the compensating device of the present invention comprises an angle sensor for detecting a crank angle, i.e., a rotational angle of a crankshaft, a contact sensor for detecting contact between stoppers on molds or a position sensor for detecting that a slide has reached a preset control position near the bottom dead center of the slide, a controller, setting means for setting a control condition for the slide bottom dead center position in the controller beforehand, and bottom dead center compensating means.

The controller calculates a crankshaft rotational angle during the contact between the stoppers or a crankshaft rotational angle under a condition of the slide descending from the control position based on the contact sensor and the angle sensor or on the position sensor, the angle sensor and the control position set by the setting means, calculates a slide compensation amount necessary for making the calculated crankshaft rotational angle equal to a control rotational angle preset by the setting means, and outputs the calculated slide compensation amount to the bottom dead center compensating means, causing the bottom dead center compensating means to compensate the bottom dead center position of the slide depending on the output slide compensation amount so that the crankshaft rotational angle coincides with the control rotational angle.

The bottom dead center compensating means comprises a device for extending and contracting an extensible member and correcting the slide position as disclosed in, e.g., U.S. Pat. No. 5,493,959.

Thus, since the bottom dead center position of the slide is compensated by using the crank angle taken when the slide reaches the preset control position near the bottom dead center, the present invention can compensate the slide bottom dead center position regardless of whether or not molds are provided with stoppers.

DETAILED DESCRIPTION OF THE INVENTION

Figure 1A:
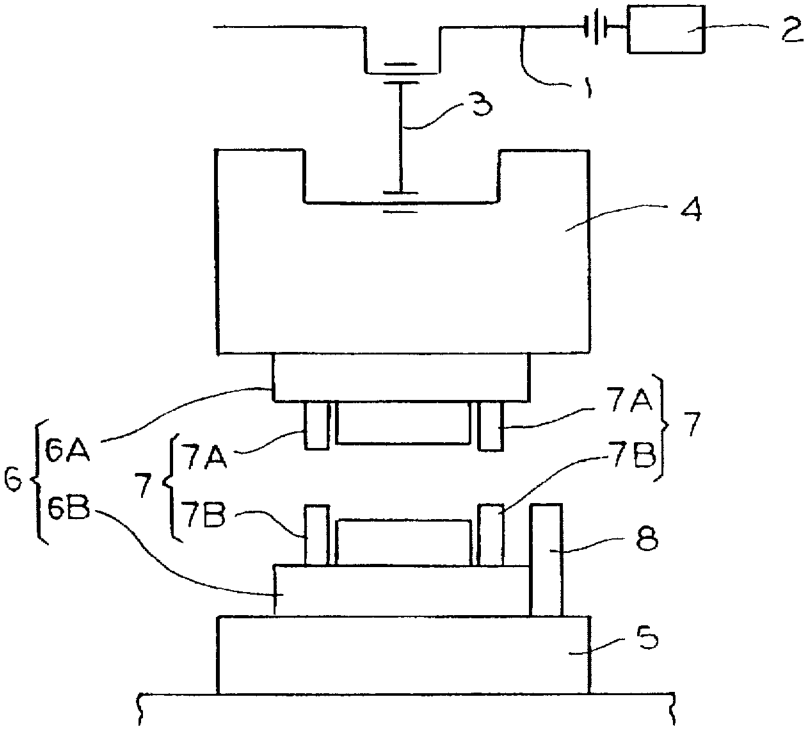
FIGS. 1(*a*) and 1(*b*) shows principal construction of the present invention.
Figure 1B:
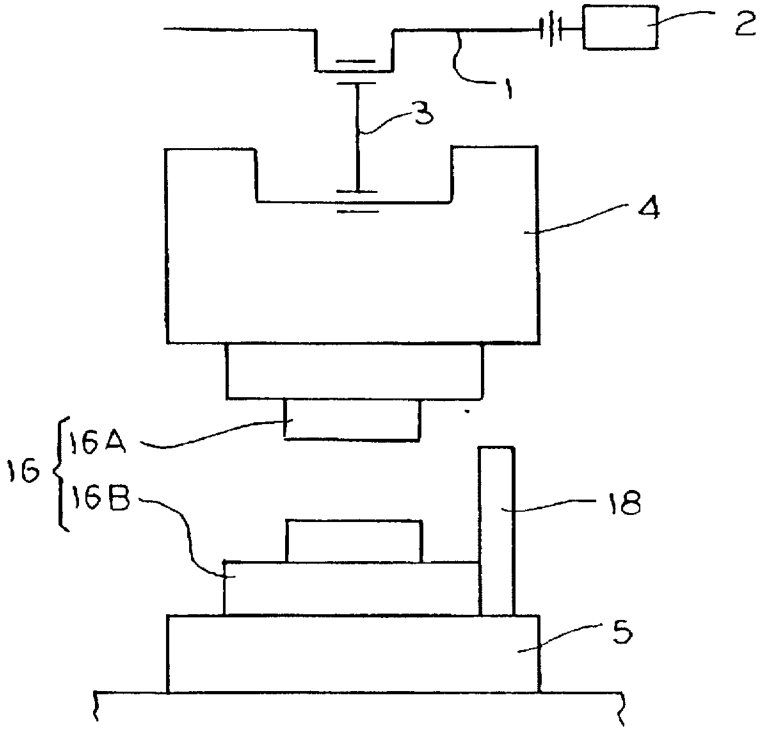
Figure 2A:
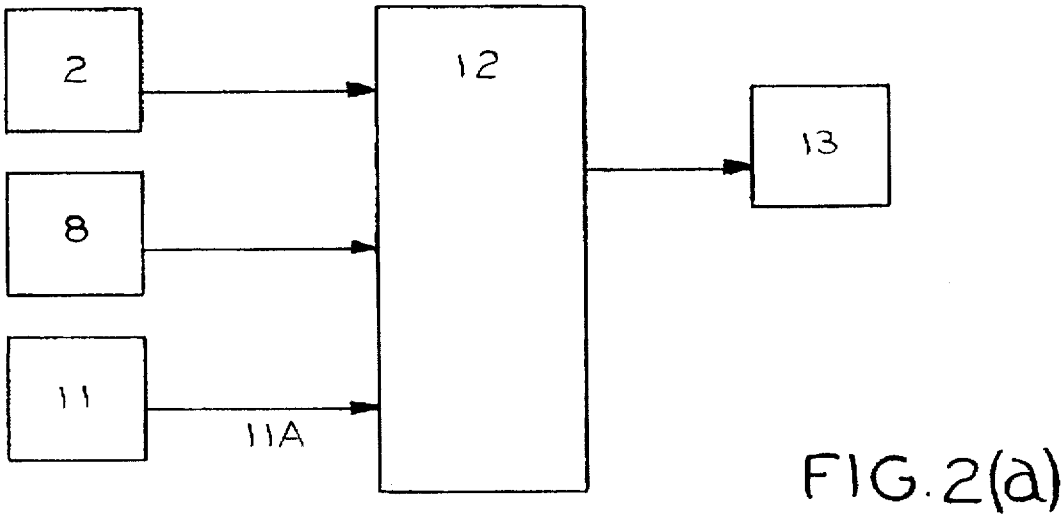
FIGS. 2(*a*) and 2(*b*) is a block diagram showing principal control in the present invention.
Figure 2B:
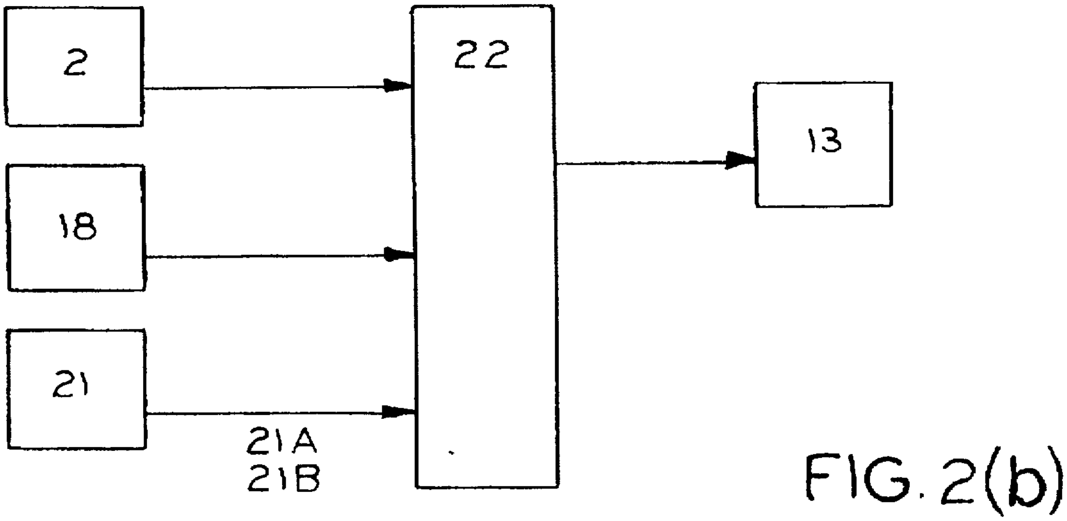

One embodiment of the present invention will be first described with reference to FIGS. 1(*a*), 2(*a*) and 3(*a*).

An angle sensor 2 rotated in synch with a crankshaft 1 of a mechanical press is provided to detect a crank angle of the crankshaft 1. A slide 4 and the crankshaft 1 are connected to each other by a connecting rod 3, and the slide 4 is reciprocated with rotation of the crankshaft 1.

Of a pair of molds 6, an upper mold 6A is fixed to a slide 4 of the mechanical press and a lower mold 6A is fixed to a bolster 5 of the mechanical press. Of a pair of stoppers 7, an upper stopper 7A is fixed to the upper mold 6A and a lower stopper 7B is fixed to the lower mold 6B. A contact sensor 8 for detecting that the upper stopper 7A and the lower stopper 7B are brought into contact against each other is fixedly provided on the lower mold 6B. The contact sensor 8 may be fixedly provided on the bolster 5 rather than the lower mold 6B.

The contact sensor 8 is constituted by a touch switch, a vicinity switch, a pressure sensitive switch, a linear sensor, etc. depending on the detection accuracy required. A crank angle detected by the angle sensor 2, a contact signal generated by the contact sensor 8, and a control rotational angle 11A set by setting means 11 in a controller 12 beforehand are input to the controller 12.

The controller 12 determines a crank angle at the beginning of contact between the upper stopper 7A and the lower stopper 7B based on the contact signal from the contact sensor 8, calculates a crankshaft rotational angle during the contact of the stoppers from the above crank angle, calculates a slide compensation amount necessary for making the calculated crankshaft rotational angle equal to the preset control rotational angle, and outputs the calculated slide compensation amount to bottom dead center compensating means 13.

It is needless to say that, rather than calculating the crankshaft rotational angle from the crank angle at the beginning of contact between the upper stopper 7A and the lower stopper 7B, a change amount of the crank angle during the contact of the stoppers may be used as the crankshaft rotational angle. The bottom dead center compensating means 13 compensates the bottom dead center position of the slide depending on the output slide compensation amount.

Figure 3:
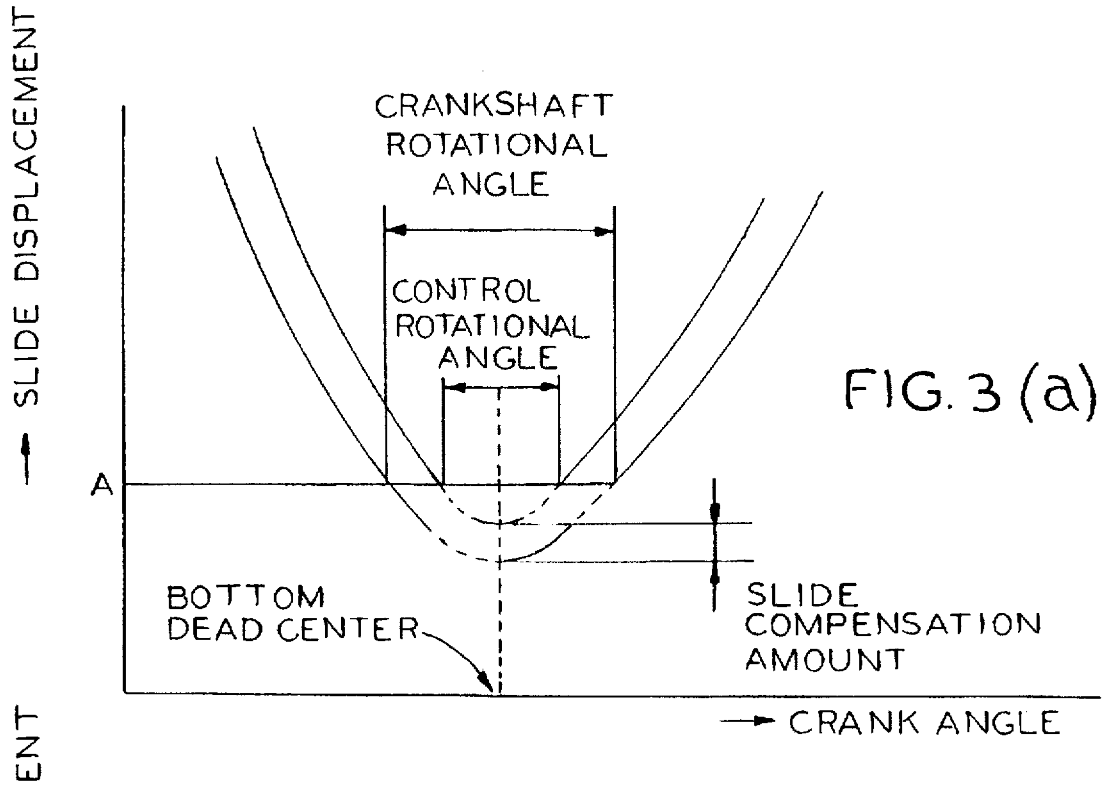
FIG. 3(*a*) and 3(*b*) shows the relationship between a slide position near the bottom dead center and a crank angle in the present invention.
Figure 3:
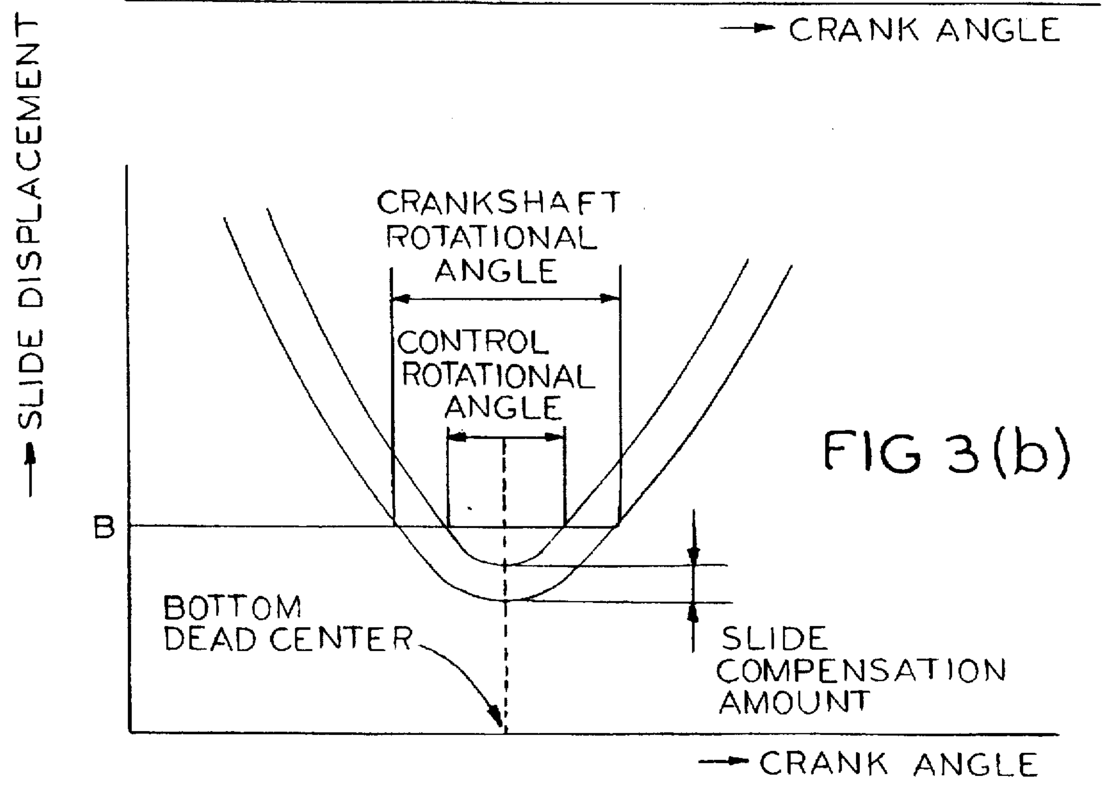

Thus, by compensating the bottom dead center position of the slide so as to make constant the crankshaft rotational angle under a condition where the upper stopper 7A and the lower stopper 7B are kept contacted against each other, the contact pressure between the stoppers 7, i.e., the bottom dead center position of the slide, possibly changed during the operation of the mechanical press is held constant. Note that a slide displacement A in FIG. 3(*a*) represents a condition where the upper stopper 7A and the lower stopper 7B are in contact relation.

Another embodiment of the present invention will be described below with reference to FIGS. 1(*b*), 2(*b*) and 3(*b*). A pair of molds 16 not provided with the upper stopper 7A and the lower stopper 7B are used in this embodiment instead of the pair of molds 6 in the embodiment of FIG. 1(*a*). A position sensor 18 comprising a linear sensor is fixedly provided on the bolster 5 or a lower mold 16B to detect the position of the slide 4 or the position of an upper mold 16A.

Based on a crank angle from the angle sensor 2, a signal indicating the position of the slide 4 or the position of the upper mold 16A and input from the position sensor 18, and a slide control position 21A set by setting means 21 in a controller 22 beforehand, the controller 22 determines a crank angle at the time when the slide 4 reaches the control position 21A, calculates a crankshaft rotational angle under a condition of the slide descending from the control position 21A, and then calculates a slide compensation amount necessary for making the calculated crankshaft rotational angle equal to a preset control rotational angle 21B.

After that, the controller 22 outputs the calculated slide compensation amount to the bottom dead center compensating means 13, causing the bottom dead center compensating means 13 to compensate the bottom dead center position of the slide depending on the output slide compensation amount so that the crankshaft rotational angle covering a period during which the slide 4 locates at the control position 21A coincides with the control rotational angle 21B. Note that a slide displacement B in FIG. 3(*b*) represents a condition where the slide 4 is at the control position 21A.

According to the present invention constituted as described above, regardless of whether or not molds are provided with stoppers, it is possible to keep constant the bottom dead center position of a slide in a mechanical press in which the molds are employed for pressing, and also hold constant the contact pressure between the stoppers.

What is claimed is:

1. In a mechanical press including a pair of molds provided with stoppers and pressing parts operated by moving said pair of molds by moving a slide fixed to one of the molds such that an upper mold and a lower mold come close to each other until said stoppers are brought into contact, a slide bottom dead center position compensating device comprising an angle sensor for detecting a rotational angle of a crankshaft operatively connected to the slide, a contact sensor for detecting contact between said stoppers, a controller, setting means for setting a preset control rotational angle representative of a bottom dead center condition in said controller, and bottom dead center compensating means, said controller calculating a crankshaft rotational angle during the contact between said stoppers based on a contact signal detected by said contact sensor and a crank angle detected by said angle sensor, calculating a slide compensation amount necessary for making the calculated crankshaft rotational angle equal to the preset control rotational angle, and outputting the calculated slide compensation amount to said bottom dead center compensating means, causing said bottom dead center compensating means to compensate the bottom dead center position of the slide depending on the output slide compensation amount so that the crankshaft rotational angle coincides with the preset control rotational angle.

2. In a mechanical press including molds provided with no stoppers and pressing parts operated by moving said molds, the press including a crankshaft driving a slide fixed to one of the molds, a slide bottom dead center position compensating device comprising an angle sensor for detecting a crank angle of the crankshaft, a position sensor for detecting the position of the slide, a controller, setting means for setting a preset control position for said slide and a preset control rotational angle for said crankshaft both representative of bottom dead center conditions in said controller, and bottom dead center compensating means, said controller calculating a crankshaft rotational angle under a condition of said slide descending from the preset control position based on a crank angle detected by said angle sensor when said position sensor detects that said slide has reached the preset control position, calculating a slide compensation amount necessary for making the calculated crankshaft rotational angle equal to the preset control rotational angle, and outputting the calculated slide compensation amount to said bottom dead center compensating means, causing said bottom dead center compensating means to compensate the bottom dead center position of said slide depending on the output slide compensation amount so that the crankshaft rotational angle under the condition of said slide descending from the preset control position coincides with the preset control rotational angle.

* * * * *